United States Patent Office 3,531,507
Patented Sept. 29, 1970

3,531,507
NOVEL ORGANOSILICON COMPOUNDS
Edward L. Morehouse, New City, N.Y., assignor to Union Carbide Corporation, a corporation of New York
No Drawing. Continuation-in-part of application Ser. No. 574,576, Aug. 24, 1966. This application Apr. 21, 1967, Ser. No. 632,534
Int. Cl. C07f 7/08, 15/00, 15/07
U.S. Cl. 260—448.2        14 Claims

ABSTRACT OF THE DISCLOSURE

Novel wetting agents comprising one unit of the formula:

$$M\left[O_3S(O)_cC_bH_{2b}O(CH_2)_x\overset{R}{\underset{|}{C}}H CH_2\overset{R'_y}{\underset{|}{S}}iO_{\frac{3-y}{2}}\right]_d$$

wherein M is a cation having a valence of 1 to 4, R is hydrogen or alkyl, R' is monovalent hydrocarbon, b is 2 to 4, c is 0 to 1, x is 0 to 1, y is 0 to 2, and d is 1 to 4, and 1 to 4 units of the formula:

$$Z_zSiO_{\frac{4-z}{2}}$$

wherein Z is monovalent hydrocarbon and z is 0 to 3, and aqueous solutions thereof. Novel alkenyl organic ether sulfur compounds of the formula:

$$M[O_3S(O)_cC_bH_{2b}O(CH_2)_xC(R)=CH_2]_d$$

wherein M, R, b, c, and d are as defined above.

---

This application is a continuation-in-part application of copending application Ser. No. 574,576 filed Aug. 24, 1966.

This invention relates to organosilicon compounds and particularly to sulfonatoalkyleneoxyalkylsiloxanes, i.e., siloxanes containing a sulfonate group bonded to silicon through an ether linkage and sulfatoalkyleneoxyalkylsiloxanes, i.e., siloxanes containing a sulfate group bonded to silicon through an ether linkage and to methods of making same.

The compounds of this invention are siloxanes containing one sulfonate or sulfate siloxy unit of the formula:

$$M\left[O_3S(O)_cC_bH_{2b}O(CH_2)_x\overset{R}{\underset{|}{C}}HCH_2\overset{R'_y}{\underset{|}{S}}iO_{\frac{3-y}{2}}\right]_d \quad (I)$$

wherein M is a cation selected from the class consisting of monovalent, divalent, trivalent and tetravalent cations. R is a member of the class consisting of hydrogen and alkyl having 1 to 18 carbon atoms, R' is a monovalent hydrocarbon group free of aliphatic unsaturation and having 1 to 18 carbon atoms, b is an integer of 2 to 4, preferably 2 or 3, c is an integer of 0 to 1, x is an integer of 0 to 1, y is an integer of 0 to 2, preferably 0 or 1, and d is an integer of 1 to 4 and is equal to the valence of M, and 1 to 4 units of the formula:

$$Z_zSiO_{\frac{4-z}{2}} \quad (II)$$

wherein Z is a monovalent hydrocarbon group free of aliphatic unsaturation and having 1 to 18 carbon atoms and z is an integer of 0 to 3.

Typical of the monovalent hydrocarbon groups represented by R' and Z in the above formulas are the linear alkyl groups (e.g., methyl, ethyl, propyl and butyl groups), cyclic alkyl groups (e.g., cyclopentyl and )cyclohexyl groups), the aryl groups (e.g., phenyl and naphthyl groups), the alkaryl groups (e.g., tolyl groups), and the aralkyl groups (e.g., the beta-phenylethyl group). Typical of the groups representing $C_bH_{2b}$ in the above formula are the 1,2-ethylene, 1,2-propylene, and 1,4-butylene groups. Typical of the units represented by Formula II are the $SiO_2$, monomethylsiloxy, dimethylsiloxy, trimethylsiloxy, monophenylsiloxy, diphenylsiloxy, triphenylsiloxy, beta-phenylethylsiloxy and methyl(ethyl)siloxy units.

Representative alkyl groups represented by R in Formula I above include methyl, ethyl, decyl and octadecyl.

The cation M of Formula I is typified by alkali metal cations, e.g., sodium, potassium, lithium, or cesium, or rubidium, ammonium cation, alkyl or aryl substituted ammonium, including trialkylamine cations, e.g., $Et_3NH^+$ tetra-alkyl ammonium cations wherein the alkyl substituents have 1 to 18 carbon atoms, e.g., tetramethyl ammonium cation, the cuprous cation, divalent metal cations, e.g., barium, calcium, strontium, cobalt, nickel, copper, tin, lead, mercury, zinc, cadmium, magnesium, iron and the like, and trivalent metal cations, e.g., cobalt, iron, aluminum, and tetravalent metal cations.

The groups R' and Z each can be the same or different throughout the same unit. When d is more than 1, the groups R, R', and Z and the integers x, y, and z each can be the same or different throughout the same unit. The groups R, R', and Z and the integers x, y, and z each can be the same or different throughout the same molecule. The novel siloxanes can contain two or more different siloxy moieties in the unit of Formula I and/or two or more different units of Formula II in the same molecule or all siloxy moieties of the unit of Formula I and/or all the units of Formula II may be the same throughout the same molecule.

The novel sulfonatoalkyleneoxyalkylsiloxanes are conveniently made by the addition of hydrosiloxanes, e.g., siloxanes containing silanic hydrogen, and sulfonates or sulfates of alkenyl ethers. This reaction is illustrated by the equation:

(A) $M[O_3S(O)_cC_bH_{2b}O(CH_2)_xC(R)=CH_2]_d + dHSi(R')_yO_{\frac{3-y}{2}}$ $\rightarrow M\left[O_3S(O)_cC_bH_{2b}O(CH_2)_xCH(R)CH_2Si(R')_yO_{\frac{3-y}{2}}\right]_d$ wherein M, R, R', b, c, d, x and y are as defined above.

In general, the reaction illustrated by Equation A can be conducted employing, preferably, from 10 to 20 parts per million parts by weight of the reactants of a platinum catalyst, e.g., in the form of chloroplatinic acid dissolved, if desired, in a solvent, such as, tetrahydrofuran, ethanol, butanol or a mixture of ethanol and ethylene glycol dimethyl ether, or in the form of finely divided elemental platinum supported on a material, such as, gamma alumina or charcoal. The addition reactions are conducted at a temperature from 60° C. to 200° C. or preferably at a temperature from 70° C. to 130° C. It is preferred to conduct the reaction in the presence of a liquid organic compound or solvent in which the reactants are mutually soluble. solvents may be preferred in reaction (A) so as to provide greater compatibility between the highly polar sulfonate or sulfate and the relatively non-polar hydrosiloxane. Preferable solvents are those which do not contain highly reactive hydrogen and include aromatic hydrocarbons (e.g., toluene and xylene) and ethers (e.g., ethylene glycol diethyl ether, diethylene glycol dimethyl ether, diisopropyl ether, and dipropyl ether). Such solvents are employed in an amount from 10 parts to 1000 parts by weight per 100 parts by weight of the reactants.

The relative amounts of the alkenyl ether sulfonate or sulfate and the hydrosiloxane employed in producing the siloxanes of this invention are not narrowly critical. A slight excess of alkenyl ether sulfonate or sulfate, e.g., 10% excess, is advantageous from the standpoint of more effective and more complete reaction of silanic hydrogen.

The order in which the alkenyl ether sulfonate or sulfate, the hydrosiloxane and the platinum catalyst are mixed in forming a reaction mixture for use in producing the siloxanes of this invention is not critical. The catalyst can be added separately to the alkenyl ether sulfonate or sulfate or to the hydrosiloxane or can be added to a mixture of these materials. In the case of exothermic reactions, it is preferred to add one of the reactants incrementally to the other. Additional catalyst can be added during the course of the reaction in the event the rate of reaction decreases (e.g., due to catalyst poisoning).

The hydrosiloxanes employed in producing the novel siloxanes of this invention contain one group represented by the formula:

 (III)

wherein R' and y have the above-defined meanings. Such starting siloxanes also contain 1 to 4 groups represented by Formula II.

At the conclusion of the reaction illustrated by Equation (A), the siloxane of this invention produced as a product can be isolated from the reaction mixture by conventional means. When chloroplatinic acid is used as a catalyst, acidic compounds are formed which are preferably neutralized with a basic compound (e.g., sodium bicarbonate) before isolating the siloxane. Suitable means for isolating the siloxane include sparging the reaction mixture by passing an inert gas (e.g., nitrogen) through the reaction mixture which is maintained at an elevated temperature (e.g., a temperature up to 170° C.) to volatilize any unreacted volatile starting materials. The insoluble catalyst and any insoluble by-product can be conveniently removed by filtration. In those cases where the siloxane or the siloxane-solvent solution is immisible with the reactants, separation can be achieved by decantation or use of a separatory funnel.

The sulfonates of alkenyl ethers used as starting materials in reaction (A) above can be conveniently prepared by reaction of an alkane sultone, e.g., propane sultone,

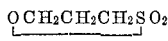

butane sultone,

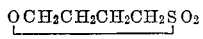

or ethane sultone,

with a monoalkenyl cation oxide:

(B) 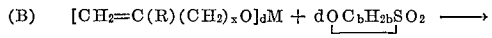

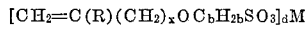

wherein M, R, d, and x are as defined above. This reaction is rapid and complete at moderate temperatures leaving no byproduct salts. The reaction is conveniently carried out by heating in a solvent at atmospheric pressure, or higher pressures and temperatures such as are obtainable in an autoclave can be used. The reaction can be carried out in the presence of a common solvent which does not contain active hydrogen. Such solvents include aromatic and other hydrocarbons and various ethers as mentioned above as solvents for reaction (A). The relative amounts of reactants are not narrowly critical and excesses of one or the other over the stoichiometric amounts shown in Equation (B) can be used. It is generally preferred to employ a slight excess of sultone to ensure complete sulfonation of the monoalkenyl cation oxide. Any alkaline material (e.g., sodium methoxide) or sultone remaining at the end of the reaction can be removed by acidification, as with HCl, followed by neutralization, as with sodium bicarbonate, and sparging with an inert gas, such as nitrogen, to desolvate.

The monoalkenyl cation oxide employed as starting material in reaction (B) can be conveniently prepared by reacting a cation alkoxide, e.g., a cation methoxide, with an alkenol:

(C) $d\text{CH}_2=\text{C}(R)(\text{CH}_2)_x\text{OH} + M(\text{O-Alkyl})_d$
$\rightarrow [\text{CH}_2=\text{C}(R)(\text{CH}_2)_x\text{O}]_dM + d\text{HO-Alkyl}$ wherein R, M, and x are as defined above and Alkyl is an alkyl radical having 1 to 6 carbon atoms. The reaction is rapid and complete at moderate tempetratures leaving no by-product salts. It is preferable to carry out reaction (C) by heating in an organic solvent such as the hydrocarbons and ethers referred to above while removing the by-product alcohol by distillation with or without sparging to drive the reaction to completion. The ratio of reactants is not narrowly critical and the use of approximately stoichiometric amounts is convenient although excesses of one or the other reactant can be used. Many of the cation alkoxides are conventionally available or are readily prepared by conventional methods and include sodium methoxide, potassium methoxide, aluminum butoxide, aluminum isopropoxide and other metal alkoxides. Metal oxides or metal hydroxides can also be used as reactants with the alkanol. When water is produced as by-product it can be removed by distillation, preferably as an azeotrope with toluene.

The novel sulfatoalkyleneoxyalkylsiloxanes can also be produced by sulfation of carbon-bonded hydroxyl-containing siloxanes (hereinafter called silicone alcohols for simplicity) with mild sulfating agents such as sulfamic acid. Such sulfations can be illustrated by the equation:

(D) 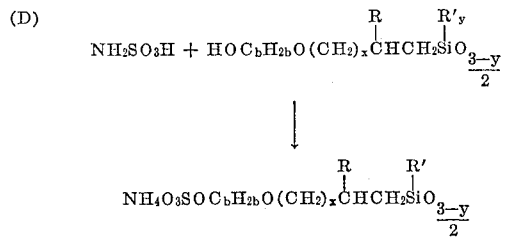

wherein R, R', b, x and y are as defined above.

The sulfating conditions used must be relatively mild. Some standard sulfating techniques customarily used to convert fatty organic alcohols to sulfates are not preferred in preparing compositions of this invention because they can cause undue cleavage of siloxane linkages and/or the ether linkage of the silicone alcohol. The strong sulfating agents which can cause cleavage include sulfuric acid, sulfur trioxide and, under certain conditions, chlorosulfonic acid. Useful sulfating agents include sulfamic acid and complexes of the stronger sulfating agents, including amine complexes, e.g., pyridine and other tertiary amine complexes, phosphorus complexes, e.g., tributyl phosphate complexes, and dimethylformamide, dioxane, and bis(β-chloroethyl) ether complexes with SO₃. Strong sulfating agents can be useful only when the reaction mixtures are well buffered to avoid highly acidic conditions. For example, chlorosulfonic acid can sometimes be used if it is added to the silicone alcohol in the presence of a tertiary amine, or if by-product HCl is rapidly removed by some other means. The amount of sulfating agent is not narrowly critical but it is preferable to employ approximately one mol of sulfating agent for each mol of carbon-bonded hydroxyl group to be sulfated in the silicone alcohol.

Effective catalysts for sulfations with sulfamic acid are dimethylformamide and dimethylacetamide. These also can perform the function of solvent. Other amides, e.g., urea, are useful catalysts. Preferably the catalyst should be present at a concentration of 0.5% or higher and when the catalyst doubles as a solvent, its concentration can be higher, these concentrations being based on the total weight of the reaction mixture.

In the synthesis of the novel compounds of this invention, solvents are not always necessary but they may aid in increasing compatibility between reactants. Amides are excellent solvents in sulfations with sulfamic acid and, as pointed out above, they also function as catalysts. Dimethylformamide and dimethylacetamide are particularly effective. Sometimes halogenated hydrocarbons, aromatic hydrocarbons and ethers are desirable as solvents in processes of this invention. The amount of solvent used is not narrowly critical and depends upon the handling and compatibility characteristics desired. As an illustration, 10 to 1000 weight parts solvent per 100 weight parts of total reactants can be used.

Preferred reaction temperatures for sulfations with sulfamic acid using a catalyst are 85–95° C. Lower temperatures are impractically slow; higher temperatures may be used but appear to offer no advantage. In the absence of a catalyst, the preferred temperature range is 110–140° C. Lower temperatures are impractically slow; higher temperatures seriously cleave ether or siloxane chains.

Preferred reaction temperatures for sulfations with chlorosulfonic acid are about 0 to 40° C. Lower temperatures are unnecessary; higher temperatures may lead to serious cleavage of ether or siloxane chains.

The above-described sulfation conditions can be employed to sulfate olefinically unsaturated organic ether alcohols (hereinafter called alkenyl ether alcohols for simplicity) used to produce the starting materials in reaction (A), i.e., the addition of alkenyl organic ether sulfates and hydrosiloxanes. Such sulfations are depicted by the equation:

(E)

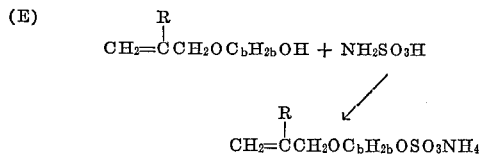

wherein R and $b$ are as defined above. Typical alkenyl organic ether alcohols include the monoallyl ethers of ethylene glycol, 1,2-propylene glycol and 1,4-butylene glycol.

In sulfations of silicone alcohols and alkenyl ether alcohols it is convenient to mix all of the sulfamic acid with the alcohol and heat to the chosen reaction temperature. Optionally, either reactant can be added to the other in increments while maintaining the chosen reaction temperature. In the case of chlorosulfonic acid, a stronger sulfating agent, sulfation should be accomplished by slow addition of the acid to the alcohol. By-product HCl is preferably removed by simultaneous sparging, use of reduced pressure or by an acid acceptor such as an amine. More powerful sulfating agents per se, such as, sulfur trioxide and sulfuric acid, have limited application in synthesizing the novel compounds of this invention, or the intermediates used in making them, because of cleavage of ether or siloxane linkages. However, complexes of such sulfating agents (e.g., amine complexes) can be employed.

The silicone alcohols used as starting materials for the sulfation reaction described above can be prepared by the addition of alkenyl ether alcohols as described and typified above and hydrosiloxanes using the addition reaction conditions hereinafter described.

The alkenyl ether alcohols used as starting materials in the sulfation described above and in the addition reaction hereinafter described are readily prepared by known methods. For example, to form the monoallyl ethers listed after Equation (E) above, the specified organic alcohol (i.e., ethylene glycol, 1,2-propylene glycol, etc.) is reacted with substantially equimolar amounts or less of NaOMe to first form the monoalkoxide which is then reacted with allyl chloride to result in the monoallyl ether of the specified organic alcohol, which then can be separated in relatively pure condition. NaOH can be employed, if desired. Alternatively, the alkenyl ether alcohols can be prepared by reacting one mol of an alkenol, e.g., allyl alcohol, with one mol of an alkylene oxide, e.g., ethylene oxide, butylene oxide or propylene oxide.

The addition reaction between an alkenyl ether alcohol and hydrosiloxane in preparing the silicone alcohol starting materials for sulfation can be depicted by the equation:

(F)

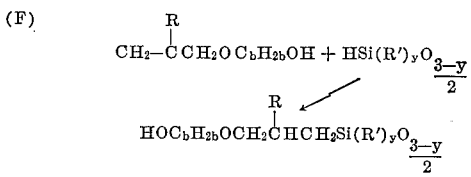

wherein M, R, R', $b$, and $y$ are as defined above.

In general, the reaction illustrated by Equation (F) can be conducted under conditions and in the manner set forth in regard to reaction (A).

The siloxanes of this invention having sodium as the cation, M, can be converted to siloxanes having cations other than sodium by conventional metathetical reactions using chlorides of such other cations, for example, of the formula $MCl_d$. Sodium chloride is produced by the metathesis and the selection of reaction medium should be such that sodium chloride precipitates out while the siloxane reactant, the $MCl_d$ reactant, and the siloxane product remain substantially in solution during the reaction. Since, in the metathesis, the siloxane reactant and product and many of the chlorides $MCl_d$ are soluble in toluene or ether while sodium chloride is not, either of these two solvents can be used as the reaction medium. For example, stannous chloride, stannic chloride, potassium chloride, aluminum chloride, and zinc chloride are soluble in ether, which can be used as the medium for the metathetical reaction to convert siloxanes having sodium as the cation M into corresponding siloxanes having stannous, stannic, potassium, aluminum or zinc as the cation M. When the cation M of the novel siloxanes is multivalent and the siloxane has substantially more than one sulfonate siloxy unit, cross-linking can occur through the multivalent cation to provide a three dimensional resin. By similar procedures ammonium and alkyl ammonium siloxane sulfonates may be prepared. Cation exchange resins can also be used to replace the cations of the novel siloxanes with other cations.

The novel siloxanes are excellent anionic surfactants and are capable of greatly lowering the surface tension of water, in some cases as low as 20 dynes/cm. They are useful as powerful wetting agents for polyethylene, cotton and many other substrates. They are also useful as emulsifiers, foaming agents and detergents.

Aqueous solutions of the water-soluble novel siloxanes exhibit very low surface tensions and are useful in a variety of applications, e.g., in the production of treating baths in the textile industries, in wetting a wide variety of substrates including polyethylene, cotton, synthetic fibers (e.g., Fortrel, Dacron, Kodel, etc.), blends of cotton and synthetic fibers, etc.; in the production of emulsions for use in making polishes and waxes for floors, automobiles, furniture, etc.; in the production of cleaning solutions and so on. Such aqueous solutions can contain as little as 0.01 weight percent and up to 20% or the solubility concentration of the novel siloxane; however, in the usual case, amounts of 0.05 to 1 weight percent are most useful for providing the surface tension lowering effects desired. The aqueous solutions can contain other water-soluble or water-miscible solvents such as lower alkanols including methanol, ethanol, propanol, isopropanol and tert-butanol for a variety of purposes including to promote greater solubility of the novel siloxane or other components of the solution.

The following examples are presented in which Me represents methyl, Et represents ethyl, all refluxing was done at ambient pressure and all parts and percentages are on a weight basis, unless otherwise specified.

EXAMPLE 1

A solution of 2-allyloxyethanol (102.1 g., 1.0 mol) in 200 g. of toluene in a one-liter flask was heated to reflux and traces of water removed by azeotropic distillation. Chloroplatinic acid (0.018 milli-mols of platinum) was added. Simultaneously from two dropping funnels, 3-hydroheptamethyl-trisiloxane (222.5 g., 1.0 mol) and 2-allyloxyethanol (10.2 g., 0.1 mol) containing chloroplatinic acid (0.012 millimols of platinum) were added dropwise to the solution over a period of 1½ hours while maintaining the reaction temperature at 100–115° C. The resulting reaction mixture was maintained at 110° C. for three hours longer, then fractionated by distillation. At 70–75° C. and 0.03–0.05 mm. of Hg, the liquid silicone alcohol $$Me_3SiO[HOC_2H_4OC_3H_6SiMeO]SiMe_3$$

was obtained.

The above silicone alcohol (71.0 g., 0.218 mol), sulfamic acid (23.3 g., 0.24 mol) and 150 g. of N,N-dimethylformamide in a 500 ml. flask were heated for 3 hours at 85° C. Ammonia gas was bubbled through the reaction mixture to neutralize small amounts of residual acids. The mixture was then filtered and solvent removed by heating up to 80° C. at reduced pressure. The product was a silicone sulfate of composition $$Me_3SiO[NH_4O_3SOC_2H_4OC_3H_6SiMeO]SiMe_3$$

It was an extremely viscous liquid which was soluble in water.

This silicone sulfate was very surface active, as shown by the following test results:

(A) AQUEOUS SURFACE TENSIONS (DUNOUY METHOD)

| Wt. percent aqueous solution | Silicone, dynes/cm. | Duponol C,[1] dynes/cm. |
|---|---|---|
| 1.0 | 20.1 | 32.9 |
| 0.1 | 21.6 | 30.4 |
| 0.01 | 37.3 | 38.2 |

[1] Sodium lauryl sulfate.

(B) Wetting of polyethylene

A droplet (0.02 ml.) of an aqueous solution of one wt. percent silicone sulfate was applied by syringe to a clean sheet of polyethylene. Within three minutes the diameter of the droplet had increased over 300%. This order of wetting of polyethylene is greater than has been observed with organic anionics. For example, Duponol C provided only a 38% increase.

(C) Synthron Tape Method

In measuring the wetting power by the Synthron Tape Method using a 1% aqueous solution, the novel silicone sulfate provided a wetting time of 1 second, distilled water provided a wetting time of 950 seconds and Duponol C provided a wetting tmie of 3 seconds.

(D) Emulsification

A stable emulsion was formed when 4.0 g. of benzene, 6.0 g. of water and about 0.5 g. of the silicone sulfate were shaken together.

EXAMPLE 2

The sulfonate $CH_2=CHCH_2OC_3H_6SO_3Na$ (34 g., 0.17 mol) obtained by reaction of the sodium salt of allyl alcohol and propane sultone was heated in diethylene glycol dimethyl ether solvent (Ansul Ether 141), with $Me_3SiOMeHSiOSiMe_3$ (8 g., 0.04 mol) and chloroplatinic acid catalyst to 160° C. All of the silianic hydrogen reacted. The reaction product had the composition $[Me_3SiO]_2Si(Me)C_3H_6OC_3H_6SO_3Na$ and was a good foaming agent in water.

EXAMPLE 3

Chlorosulfonic acid is added dropwise to 2-allylethanol at 25° C. while sparging with nitrogen to remove HCl. The resulting acid sulfate is converted to the sodium salt by reaction with aqueous sodium hydroxide. Water is removed by azeotropic distillation with toluene. Decolorizing carbon and a filter aid are added and the mixture filtered. There results the allyl ether ethyl sulfate sodium salt of the composition $$CH_2=CHCH_2OCH_2CH_2OSO_3Na$$

A hydrosiloaxane of the formula $(Me_3SiO)_3SiH$ in toluene solution with a catalytic amount of chloroplatinic acid are heated to 70 to 80° C. A mixture of the sodium salt mentioned above, toluene and additional chloroplatinic acid are added dropwise. The reaction mixture is desolvated by sparging with nitrogen. The product is a silicone sulfate of the composition $$(Me_3SiO)_3SiCH_2CH_2CH_2OCH_2CH_2OSO_3Na$$

EXAMPLE 4

The sulfate of $CH_2=CHCH_2OC_3H_6SO_3Na$ obtained by reaction of the sodium salt of allyl alcohol and propane sultone is heated in diethylene glycol dimethyl ether solvent with $Me_3SiOSi(Me)_2H$ and chloroplatinic acid catalyst to 160° C. All the silanic hydrogen is reacted. The reaction product has the composition $Me_3SiOSi(Me)_2C_3H_6OC_3H_6SO_3Na$ and is a good foaming agent in water.

EXAMPLE 5

A solution of 2-allyloxyethanol in toluene is heated to reflux and traces of water are removed by azeotropic distillation. Chloroplatinic acid is added. Simultaneously from two dropping funnels, a hydrosiloxane of the formula $[Me_2SiO]_3[MeSiHO]$ and 2-allyloxyethanol containing chloroplatinic acid are added dropwise to the solution over a period of 1½ hours while maintaining the reaction temperature at 100 to 115° C. The resulting reaction mixture is maintained at 110° C. for 3 hours longer, then fractionated by distillation. A liquid silicone alcohol of the formula $$[Me_2SiO]_3[HOC_2H_4OC_3H_6SiMeO]$$

is obtained.

The above silicone alcohol, sulfamic acid and N,N-dimethylformamide are heated for 3 hours at 85° C. Ammonia gas is bubbled through the reaction mixture to neutralize small amounts of residual acids. The mixture then is filtered and solvent removed by heating up to 80° C. at reduced pressure. The product is a silicone sulfate of the composition $$[Me_2SiO]_3[NH_4O_3SOC_2H_4OC_3H_6SiMeO]$$

The resulting tetramer is soluble in water and exhibits excellent surface active properties.

The novel siloxanes prepared in the above examples are water-soluble and are especially useful as wetting agents and can be also used as profoamers, emulsifiers, and surface tension lowering agents.

What is claimed is:
1. An organosiloxane composed of (I) only one group having the formula:

$$M\left[O_3S(O)_cC_bH_{2b}O(CH_2)_x\overset{R}{\underset{|}{C}}H\overset{R'_y}{\underset{|}{C}}H_2SiO_{\frac{3-y}{2}}\right]_d \quad (I)$$

wherein M is a cation selected from the class consisting of monovalent cations selected from the class consisting of ammonium cation, alkali metal cation, trialkyl and tetraalkyl substituted ammonium cations having to 18 carbon atoms per alkyl substituent and the cuprous cations; divalent metal cations from the class consisting of barium, calcium, strontium, cobalt, nickel, copper, tin, lead, mercury, zinc, cadmium, magnesium and iron; and trivalent metal cations from the class consisting of cobalt, iron and aluminum, R is a member of the class consisting of hydrogen and alkyl having 1 to 18 carbon atoms, R' is a monovalent hydrocrabon group free of aliphatic unsaturation and having 1 to 18 carbon atoms, $b$ is an integer of 2 to 4, $c$ is an integer of 0 to 1, $x$ is an integer of 0 to 1, $y$ is an integer of 0 to 2, and $d$ is an integer of 1 to 3 and is equal to the valence of M, and (2) 1 to 4 units each of the formula:

$$Z_zSiO_{\frac{4-z}{2}} \qquad (II)$$

wherein Z is a monovalent hydrocrabon group free of aliphatic unsaturation having 1 to 18 carbon atoms, and $z$ is an integer of 0 to 3.

2. An organosiloxane as claimed in claim 1 wherein M is selected from the group consisting of alkali metal cations, ammonium cation, alkyl-substituted ammonium cation, and aryl-substituted ammonium cation.

3. Organosiloxane as claimed in claim 2 wherein M is ammonium, $c$ is 1, $b$ is 2, $x$ is 1, R is hydrogen, $y$ is 1, R' is methyl and wherein there are two units of Formula II, wherein Z is methyl and $z$ is 3, said organosiloxane having the composition $$Me_3SiO[NH_4O_3SOC_2H_4OC_3H_6SiMeO]SiMe_3$$

4. Organosiloxane as claimed in claim 2 wherein M is sodium, $c$ is 0, $b$ is 3, $x$ is 1, R is hydrogen, $y$ is 1, and R' is methyl, and wherein there are two units of Formula II, wherein Z is methyl and $z$ is 3, said organosiloxane having the composition $$[Me_3SiO]_2Si(Me)C_3H_6OC_3H_6SO_3Na$$

5. Organosiloxane as claimed in claim 2, wherein M is sodium, $c$ is 1, $b$ is 2, $x$ is 1, R is hydrogen, $y$ is 0, and wherein there are three units of Formula II, wherein Z is methyl and $z$ is 3, said organosiloxane having the composition $(Me_3SiO)_3SiC_3H_6OCH_2CH_2OSO_3Na$.

6. Organosiloxane as claimed in claim 2 wherein M is sodium, $c$ is 0, $b$ is 3, $x$ is 1, R is hydrogen, $y$ is 2, and R' is methyl, and wherein there is one unit of Formula II, wherein Z is methyl and $z$ is 3, said organosiloxane having the composition $$Me_3SiOSi(Me)_2C_2H_6OC_3H_6SO_3Na$$

7. An organosiloxane cyclic tetramer as claimed in claim 2 wherein M is ammonium, $c$ is 1, $b$ is 2, $x$ is 1, R is hydrogen, $y$ is 1, R' is methyl, and wherein there are three units of Formula II, wherein Z is methyl and $z$ is 2, said cyclic tetramer having the formula $$[Me_2SiO]_3[NH_4O_3SOC_2H_4OC_3H_6SiMeO]$$

8. An aqueous solution containing the organosiloxane as claimed in claim 1.

9. An aqueous solution containing the organosiloxane as claimed in claim 2.

10. An aqueous solution of organosiloxane claimed in claim 3.

11. An aqueous solution containing the organosiloxane as claimed in claim 4.

12. An aqueous solution of the organosiloxane as claimed in claim 5.

13. An aqueous solution of the organosiloxane as claimed in claim 6.

14. An aqueous solution of the organosiloxane as claimed in claim 7.

References Cited

UNITED STATES PATENTS

| | | | |
|---|---|---|---|
| 3,109,012 | 10/1963 | Rossmy et al. | 260—448.2 |
| 3,133,949 | 5/1965 | Rutkowski et al. | 260—448.8 X |
| 3,161,611 | 12/1964 | Rossmy | 260—448.8 X |
| 3,183,254 | 5/1965 | Rossmy et al. | 260—448.2 |
| 3,412,129 | 11/1968 | Holdstock | 260—448.2 |
| 3,418,352 | 12/1968 | Rossmy | 260—448.2 |

TOBIAS E. LEVOW, Primary Examiner

P. F. SHAVER, Assistant Examiner

U.S. Cl. X.R.

252—353; 260—429, 429.7, 429.9, 431, 435, 438.1, 439, 448, 448.8, 457, 513

UNITED STATES PATENT OFFICE
CERTIFICATE OF CORRECTION

Patent No. 3,531,507   Dated September 29, 1970

Inventor(s) E. L. Morehouse

It is certified that error appears in the above-identified patent and that said Letters Patent are hereby corrected as shown below:

Column 8, line 66, after "having" insert "1".

Column 9, last line, that portion of the formula reading "$C_2H_6$" should read "$C_3H_6$".

Column 10, line 12, after "of" insert "the".

Signed and sealed this 28th day of March 1972.

(SEAL)
Attest:

EDWARD M. FLETCHER, JR.
Attesting Officer

ROBERT GOTTSCHALK
Commissioner of Patents